Sept. 12, 1967 — A. P. PETZOLD — 3,340,889
PIPE-CLEANER VALVE
Filed Feb. 1, 1967 — 2 Sheets-Sheet 1
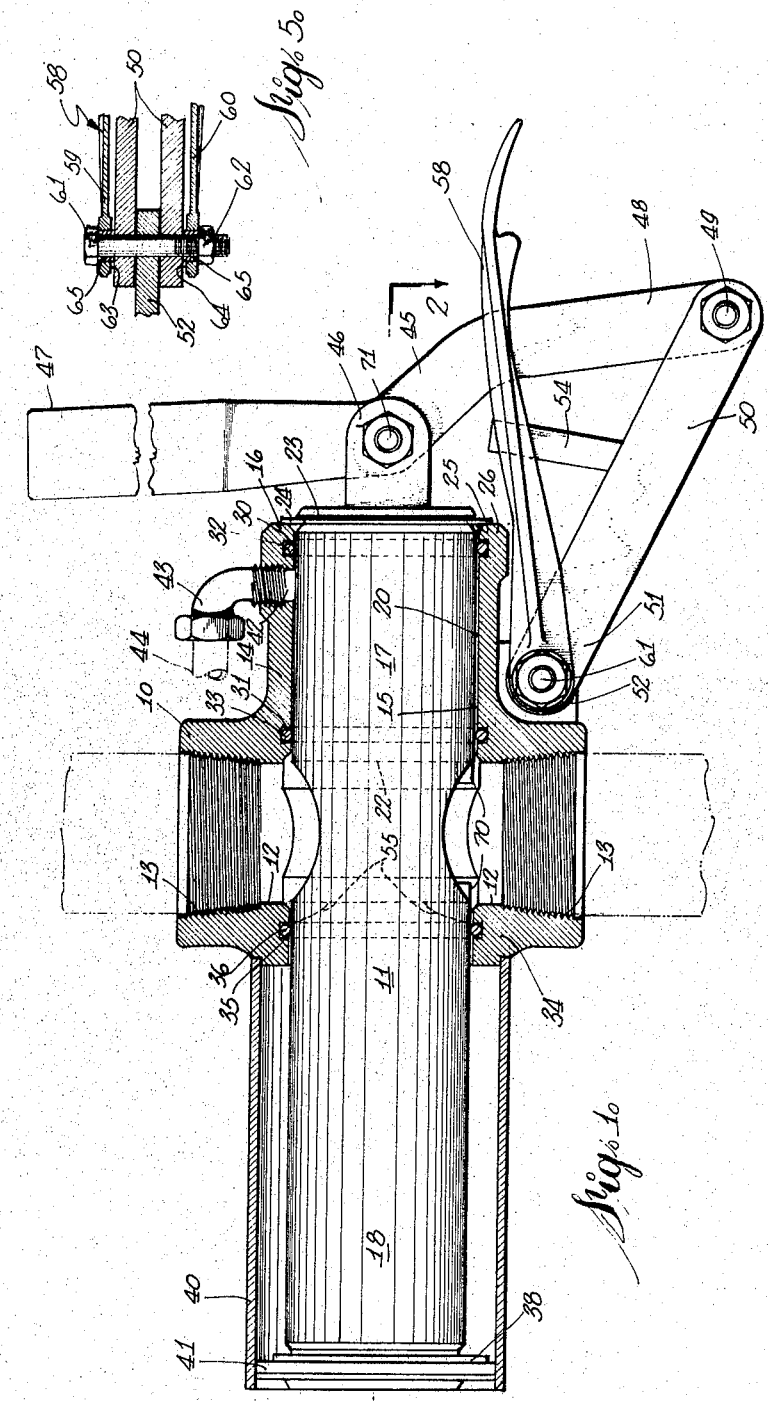
INVENTOR
Armin P. Petzold
BY
Weir, Marshall, MacRae & Land
PATENT AGENT Sept. 12, 1967   A. P. PETZOLD   3,340,889
PIPE-CLEANER VALVE
Filed Feb. 1, 1967   2 Sheets-Sheet 2
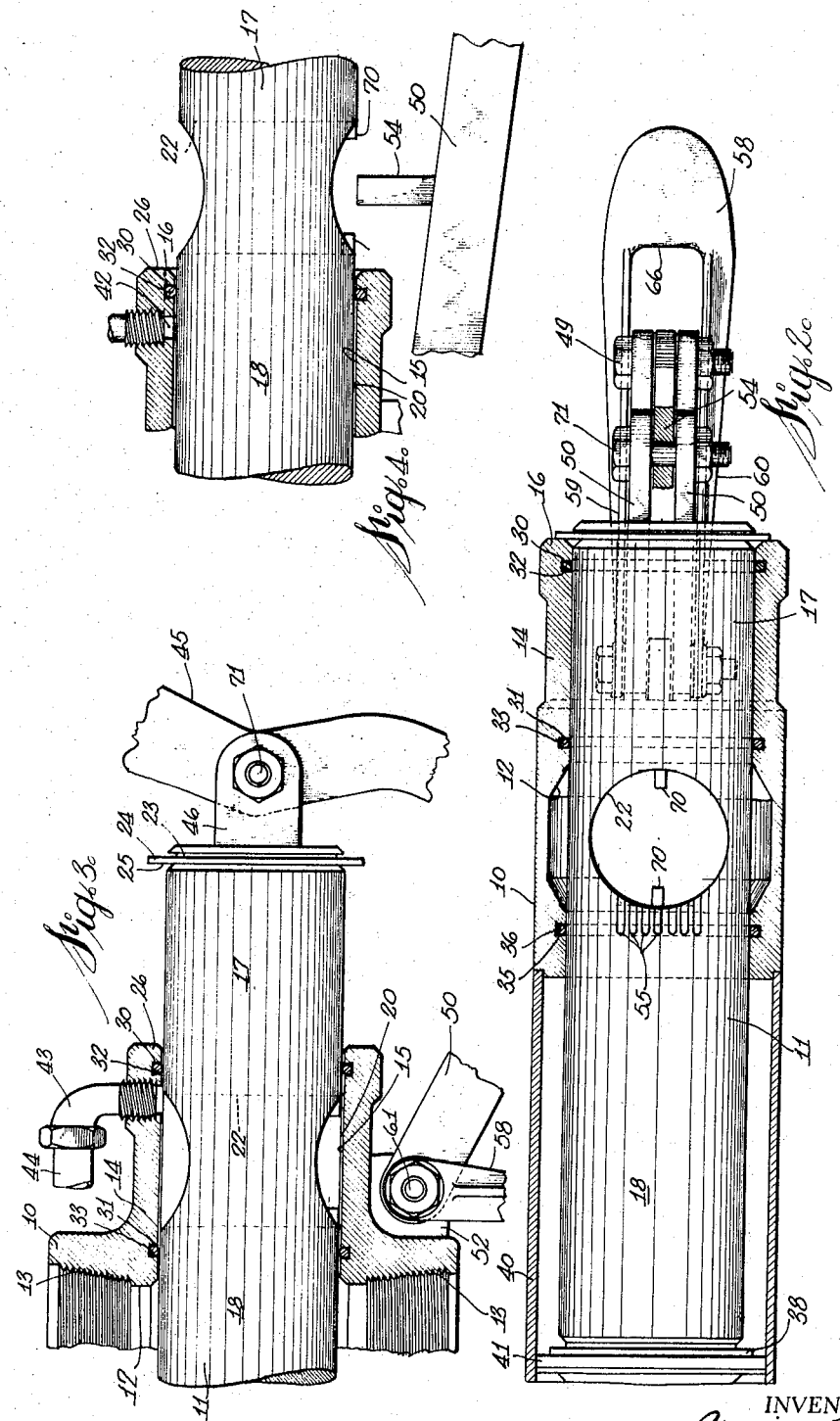
INVENTOR
Armin P. Petzold
BY
Heir, Marshall, MacRae & Land
PATENT AGENT

United States Patent Office 3,340,889
Patented Sept. 12, 1967

3,340,889
PIPE-CLEANER VALVE
Armin P. Petzold, Edmonton, Alberta, Canada, assignor to Barber Machinery Co. Limited, South Edmonton, Alberta, Canada
Filed Feb. 1, 1967, Ser. No. 613,296
14 Claims. (Cl. 137—268)

ABSTRACT OF THE DISCLOSURE

Valve for inserting pipeline cleaners, having a plunger with a bore normally alignable with the pipeline bore and reciprocable to and from this positon to a position in which the plunger is outside the valve housing. A pressure bleed is provided for reducing the pressure in the plunger bore to atmosphere before it moves outside the valve housing.

---

As is well known, when material is conveyed by a pipeline, deposits occur on the interior surface of the pipe and affect the flow through the pipe. To maintain the interior surface of the pipe clean, it is the practice to insert pipeline cleaners, usually referred to as go-devils or pigs, into the pipe. The flow of material through the pipe pushes the cleaner along the pipeline. The cleaner is usually slightly smaller in diameter than the pipe and may or may not have protuberances on its surface. As the cleaner is pushed along the pipe, it scrapes off any deposits on the interior surface.

Various means have been used to insert, and remove, cleaners. A short section of the pipeline can be isolated by valves and when the valves are closed the section can be drained and opened for insertion of the cleaner. After the section is closed, the valves are opened and the cleaner pushed through the pipe. This way of inserting pigs is time-consuming, interferes with the flow of material in the pipe for a considerable period and also results in the wasting of some of the material being conveyed. Other means include a branch pipe which is normally isolated from the main pipeline, but which can be connected to the pipeline for insertion of a cleaner. A further means is a rotary valve having a through bore normally in alignment with the pipeline bore, and a transverse bore which receives a pipe-cleaner, the valve then being rotated to align the transverse bore with the pipeline bore and thus insert the cleaner into the pipeline.

While rotary valves can provide a simple and effective means for inserting, and removing, pipe-cleaners, there are certain disadvantages. Particularly, sealing difficulties arise which are accentuated by the varying pressures which the valve may be subjected to during operation. While effective seals can be provided, these are relatively expensive.

The present invention is concerned with providing a pipeline cleaner valve which is simple and inexpensive. The valve is of reciprocable form and utilizes simple seals. It is easily operated and can be independent of direction of flow in the pipeline.

According to one particular form there is provided a pipeline cleaner valve having a housing with a through bore for alignment with the bore of the pipeline and a tubular extension which has a bore which is transverse to and intercepts the through bore. A plunger is movable axially in the transverse bore, the plunger formed with its opposite end portions of such dimensions that there is a small clearance between the plunger and the transverse bore. The plunger has a bore therethrough, intermediate the end portions, the plunger bore being alignable with the through bore of the housing. Seals are provided, either side of the through bore and at the end of the extension, to engage with the surface of the plunger. The plunger is movable axially between a first position where the bore through the plunger is aligned with the through bore of the housing, and a second position where the bore through the plunger is exposed outside the housing for insertion, or removal, of a pipe cleaner. While the plunger is in this second positon, an end portion extends across the through bore in the housing. A pressure bleed means is provided on the extension and connected to the clearance between plunger and transverse bore.

To reduce side-loading on the plunger when in the second positon, the through bore can be enlarged at the position where it is intercepted by the transverse bore. This enlargement permits continued flow through the pipeline and provides pressure balance across the plunger.

By-pass means can be provided in the plunger to pressurize the bore through the plunger as the plunger is moved from the second position to the first postiion. Stop means can be provided to stop axial movement of the plunger at an intermediate position, when moving from the first to the second position, to ensure pressure bleeding of the clearance between plunger and transverse bore.

The invention will be readily understood by the following description in connection with the accompanying drawings, in which;

FIGURE 1 is a longitudinal cross-section through one form of apparatus with the plunger in a normal position;

FIGURE 2 is a cross-section on the line 2—2 of FIGURE 1;

FIGURE 3 is a cross-section, similar to that of FIGURE 1, but showing only part of the apparatus, with the plunger in an intermediate position;

FIGURE 4 is a cross-section, as in FIGURE 3, but with the plunger at the extreme position from that in FIGURE 1; and FIGURE 5 is a scrap view of the attachment of the stop-yoke.

The apparatus illustrated in the drawings comprises a housing 10, which can be a casting machined where necessary, and a plunger 11. The housing 10 has a through bore 12, threaded at each end 13, for insertion in a pipeline. The housing 10 has a tubular extension 14 having a transverse bore 15. The extension 14 has an open outer end 16 and the transverse bore 15 intercepts the through bore 12.

Plunger 11 has end portions 17 and 18 which are so dimensioned as to form a small annular clearance 20 between the plunger and the transverse bore 15. Positioned intermediate the ends 17 and 18 is a bore 22 which passes through the plunger and is of approximately the same dimension as the through bore 12. In the arrangement illustrated the tubular extension 14, and the longitudinal axis of the plunger 11, are normal to the axis of the through bore 12 and thus the bore 22 in the plunger is normal to the longitudinal axis of the plunger and is aligned with through bore 12.

The end portion 17 of the plunger 11 is slightly longer than the distance between the periphery of the through bore 12 and the outer end 16 of the extension 14. A groove 23 is formed adjacent the outer extremity of the end portion 17 and a stop ring 24 is positioned in the groove. The distance from the inner face 25 of the ring 24 to the periphery of the bore 22 is such that when the inner face 25 abuts end face 26 of the extension 14, the bore 22 is in correct alignment with bore 12.

Formed in the periphery of the transverse bore 15 are two grooves 30 and 31, a groove adjacent each end of the transverse bore. Positioned in the grooves 30 and 31 are seals 32 and 33 respectively. The seals 32 and 33 support the plunger 11 in the transverse bore 15 wtih the aforesaid small clearance 20, and the seals also define the ends of such clearance.

The end portion 18 of the plunger 11 extends through the wall 34 of the housing 10 opposite the tubular extension 14. A groove 35 is formed in the wall 34 and a seal 36 is positioned in the groove 35. End portion 18 of the plunger is of sufficient length that when the plunger is moved to an extreme position to the right, from the position shown in FIGURE 1, the extremity of the end portion 18 is still supported by the seal 36. A groove 37 is formed in the end portion 18 of the plunger and a stop ring 38 is positioned in the groove 37. Stop ring 38 limits the axial movement of the plunger to prevent the plunger being moved to such an extent that the through bore 12 is opened to the exterior of the housing.

To protect the plunger 11, a tubular casing 40 is attached to the housing 10. A seal 41 is pressed into the end of the tubular casing 40 to prevent atmospheric corrosion and ingress of dust and other foreign matter. This arrangement of seal 41 provides a safety precaution as any failure of seal 36 will not produce any net end thrust in the axial direction of the plunger.

A bleed hole 42 is formed through the tubular extension 14 adjacent to the groove 30 and seal 32 but inboard thereof. The bleed hole communicates with the clearance 20. A tubular elbow 43 is screwed into the bleed hole and a short length of tube 44 extends from the elbow, in a direction away from the outer end 16 of the extension.

The plunger is moved axially by a handle formed by a lever 45. Lever 45 is pivotally attached, at a position intermediate its ends, to a lug 46 attached to the end of the plunger. One end, the upper end 47 in FIGURE 1 is grasped by the operator, and the other end 48 is pivotally attached at 49 to one end of a pair of levers 50. The other end 51 of the pair of levers is pivotally attached to a lug 52 on the housing 10. To move the plunger 11 axially the operator pulls or pushes on the upper end 47.

The apparatus works as follows. With the plunger in the position shown in FIGURE 1, there is full flow of material in the pipeline, through the through bore 12 and bore 22. When it is desired to insert a pipe-cleaner the plunger is moved to the right (in FIGURE 1). The movement can be broken down into a sequence of steps. Firstly, a small movement connects bore 22 with the clearance 20. In this position the pressure in the clearance will vary from the pressure in the pipeline at a position immediately adjacent to and to the right of seal 33 to substantially atmospheric pressure at the bleed hole 42.

Further movement of the plunger brings the bore 22 entirely between the seals 32 and 33. The plunger can be moved a small axial distance whilst still keeping the bore 22 between the seals 32 and 33, and while the plunger is in such a position the bore 22 is connected to atmosphere via clearance 20 and bleed hole 42. This intermediate position is shown in FIGURE 3. When the pressure in the bore 22 is reduced to atmospheric pressure, the plunger can be moved further to the right until stop ring 38 engages the exterior of wall 34 of the housing 10. At this position the bore 22 is entirely outside the tubular extension 14. This position is illustrated in FIGURE 4.

A pipeline cleaner is inserted into the bore 22. To avoid the necessity of the operator holding the cleaner in position with his fingers, and risking damage thereto, a stop 54 is attached to one of the pair of levers 50. The stop 54 holds a cleaner in the bore 22 until the plunger is moved sufficiently for the bore to be entering the extension 14. The plunger 11 is pushed completely to the left, FIGURE 1, until the inner face 25 of stop ring 24 contacts the end face 26 of tubular extension 14.

It has been found that the seal 33 is liable to fail as a result of distortion of the seal when the bore 22 first communicates with the through-bore 12, on movement of the plunger back to the normal position, as in FIGURE 1. It is believed that, as the bore 22 first communicates with through-bore 22, a pressure effect was created which pulled the seal out of its groove. In the particular examples used, the seal was of synthetic resin, polytetrafluoroethylene, and the seal took a permanent set. The protruding section of the seal was sheared off on continued movement of the plunger.

The difficulty is avoided by a feature of the invention whereby the bore 22 is pressurized before the leading edge of the bore 22 passes the seal. Slots 55 are cut in the plunger at what will be the leading edge of the bore 22 when the plunger is being moved back to the normal position (FIGURE 1). As the plunger is being moved to the left, from the position in FIGURE 4 to the position of FIGURE 1, the slots 55 first communicate with through bore 12, to permit pressure flow into bore 22, while the seal 33 is still supported by the material of the plunger between the slots. This avoids pulling out of the seal 33 from its groove 31.

As described above, the clearance 22 and bleed hole 42 provide for bleeding of the pressure from bore 22 when the plunger is being moved to right, in FIGURE 1. To ensure that the plunger is stopped at a position where the bore 22 is between the seals 32, 33, to allow complete bleeding of the pressure, a stop-yoke 58 can be provided. The yoke is of elongate channel formation, having legs 59 and 60 pivotally connected to the lug 52.

The yoke 58 is frictionally held at any desired rotative position. One arrangement for attaching the yoke is illustrated in more detail in FIGURE 5. The legs 59 and 60, of the yoke 58, are pivotally connected at their ends by a bolt 61 and nut 62. The distance between opposed faces 63 and 64 of the legs 59 and 60, in the free or unattached condition is slightly greater than the distance when attached. Thus the legs 59 and 60 are sprung towards each other as the nut 62 is tightened on the bolt 61. This provides sufficient frictional force to maintain the yoke 58 in any desired rotative position. To avoid locking the yoke when the nut 62 is tightened, spacers 65 are provided, the length of the spacers being slightly more than the thickness of the legs 59 and 60.

When the plunger is in the normal position, FIGURE 1, the yoke is in the position as shown. On movement of the handle 47, and lever 45, the lower part of the lever 45 contacts the base portion 66 of the yoke at a position of the plunger at which the bore 22 is between the seals 32, 33. To move the handle, and plunger, further, the yoke must be pushed down to enable the lever 45 to be moved, further. The form of yoke 58 can be readily seen in FIGURE 2.

Yet a further feature of the invention is concerned with providing a pressure balance across the plunger when it is moved to the position illustrated in FIGURE 4. It will be appreciated that with the plunger moved to the right, the end portion 18 extends across the through-bore 12. If the through-bore is of substantially the same diameter as the plunger then flow in the through-bore is shut off. Normally, the plunger is larger than through-bore 12 to permit the bore 22 to be of the same diameter as through-bore 12. Thus the plunger has the pressure in the pipeline acting on one side and considerable side-forces are produced. This results in wear of the plunger and housing and also makes operation of the apparatus difficult as considerable force will be required to move the plunger.

While these features of wear and difficult operation may be acceptable in certain instances, it is useful if they can be avoided or the difficulties at least reduced. This can be done by providing at least some pressure balance across the plunger and is accomplished by making the through bore 12 of increased dimensions where it is traversed by the plunger 11. The enlargement of through-bore 12 can be seen in FIGURE 2. The enlargement of the through-bore 12 permits flow of material at all times and thus, in addition to providing at least a substantial level of pressure balance, interruption in the flow of material through the pipeline is reduced or avoided.

In addition to being used for the insertion of pipe-cleaners, it is advantageous that the apparatus be capable of being used for removing pipe-cleaners. To do this it is necessary to provide some means for catching and holding a cleaner in the bore 22. This can be done by providing short lugs 70 in the bore 22. When a cleaner has been caught and held by the lugs 70, it is removed by operating the apparatus in a similar manner as when a cleaner is to be inserted.

Without means for catching and holding cleaners, that is, being used only for inserting cleaners, the apparatus is independent of direction of flow in the pipeline. When provision is made for catching and holding cleaners for removal, for example lugs 70, then the plunger must be positioned so that the lugs 70 are in a downstream position in the bore 22. This means that the apparatus is not independent of flow direction in the pipeline. However, the apparatus is readily adapted to suit flow direction by attaching the handle lever 45 to the lug 46 on the plunger by a bolt and nut 71. By undoing the bolt and nut 71 and moving lever 45 out of engagement with lug 46, the plunger 11 can be rotated through 180°, to suit the direction of flow. The lever is then re-attached to the lug 46.

I claim:

1. A pipe-cleaner valve for insertion in a pipeline, said valve comprising: a housing, said housing having a through bore for alignment with the pipeline; a tubular extension to said housing, the extension having an open outer end, and including a transverse bore extending transverse to and intercepting said through bore; a plunger movable axially in said transverse bore, the plunger including a first end portion of a dimension to provide a small annular clearance in said transverse bore, a second end portion extending through a wall of said housing opposite said transverse bore; and a bore extending through said plunger, between said end portions, and alignable with said through bore; seal means in said housing on either side of said through bore and in sealing engagement with said plunger; further seal means positioned in said tubular extension adjacent the open end there of and sealingly engaging said plunger, means for axially displacing said plunger between a first position with said first end portion in said tubular extension, the plunger bore aligned with said through bore and said second end portion supported on the remote side of said through bore from said first end portion, and a second position with said first end portion and the plunger bore displaced out of the open end of said first tubular extension and the second end portion extending across said through bore; and pressure bleed means on said tubular extension connected to said annular clearance in the transverse bore.

2. A valve as claimed in claim 1, said plunger including by-pass means to pressurize the plunger bore on movement of the plunger from said second position to said first position.

3. A valve as claimed in claim 2 wherein said by-pass means comprises at least one passageway in said plunger on the side of the plunger bore remote from said first end portion, said passageway providing communication between said through bore and said plunger bore prior to the plunger bore passing the seal means in the housing on that side of said through bore adjacent said first end portion.

4. A valve as claimed in claim 3 wherein the by-pass means comprises a plurality of slots in the edge of the plunger bore, the slots extending in planes parallel to the longitudinal axis of the plunger.

5. A valve as claimed in claim 1, wherein said through bore in said housing is enlarged to provide a clearance around said plunger to permit flow of material past said plunger at all times.

6. A valve as claimed in claim 1, wherein said plunger includes protrusions in said plunger bore, adjacent the downstream end, to catch and hold a pipe-cleaner.

7. A valve as claimed in claim 1, including stop means adjacent each end of the plunger to limit axial movement of said plunger.

8. A valve as claimed in claim 1, including a tubular casing on said housing, said casing extending coaxially with said tubular extension on the opposite side of said housing to said tubular extension, the casing enclosing said second end portion of said plunger.

9. A valve as claimed in claim 8 including a seal in said casing, said seal engageable with said plunger to prevent entry of foreign matter and vapour into the casing.

10. A valve as claimed in claim 1, including movable stop means for engagement with the plunger displacing means to limit movement of said plunger, from said first position, to an intermediate position in which the plunger bore is positioned between said seal means in the tubular extension and said seal means in said housing on that side of said through bore adjacent said tubular extension, to permit bleeding of the pressure in said plunger bore and said annular clearance.

11. A valve as claimed in claim 1, including means for locating a pipe-cleaner in said plunger bore, when said plunger is in said second position, the locating means retaining the pipe-cleaner in said bore on movement of the plunger toward said first position to permit movement of plunger and pipe-cleaner into said tubular extension.

12. A valve as claimed in claim 1 further comprising; bypass means for pressurizing said plunger bore on movement of the plunger from said second position to said first position, the bypass means including at least one slot formed in an edge of the plunger bore on the side of the plunger bore remote from said first end portion, said slot providing communication between said through bore and said plunger bore prior to said plunger bore reaching the seal means in the housing on that side of said through bore adjacent said first end portion.

13. A valve as claimed in claim 12 including movable stop means for engageemnt with the plunger displacing means to limit movement of said plunger, from said first position, to an intermediate position in which the plunger bore is positioned between said seal means in the tubular extension and said seal means in said housng on that side of said through bore adjacent said tubular extension, to permit bleeding of the pressure in said plunger bore and said annular clearance.

14. A valve as claimed in claim 12 wherein said through bore in said housing is enlarged to provide a clearance around said plunger to permit flow of material past said plunger at all times.

References Cited

UNITED STATES PATENTS

| 1,110,135 | 9/1914 | Henderson | 222—365 X |
| 2,282,110 | 5/1942 | Angell | 222—365 X |
| 3,177,513 | 4/1965 | Ellett | 137—268 X |

FOREIGN PATENTS

| 12,755 | 5/1934 | Australia. |
| 321,499 | 10/1934 | Italy. |

M. CARY NELSON, *Primary Examiner.*

R. JAY MILLER, *Assistant Examiner.*